(12) United States Patent  
Kagawa

(10) Patent No.: US 10,586,145 B2  
(45) Date of Patent: Mar. 10, 2020

(54) RECORDING SYSTEM AND RECORDING METHOD

(71) Applicant: FUJIFILM CORPORATION, Minato-ku, Tokyo (JP)

(72) Inventor: Yusuke Kagawa, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 80 days.

(21) Appl. No.: 15/835,470

(22) Filed: Dec. 8, 2017

(65) Prior Publication Data

US 2018/0232619 A1 Aug. 16, 2018

(30) Foreign Application Priority Data

Feb. 10, 2017 (JP) ................. 2017-023143

(51) Int. Cl.
*G06K 19/08* (2006.01)
*G06K 19/07* (2006.01)
*G06K 19/06* (2006.01)

(52) U.S. Cl.
CPC ....... *G06K 19/08* (2013.01); *G06K 19/06028* (2013.01); *G06K 19/0723* (2013.01)

(58) Field of Classification Search
CPC ......... G06F 19/00; G06F 17/00; G06Q 30/00; G06Q 90/00; G06K 19/00
USPC ........................................ 235/385, 375, 487
See application file for complete search history.

(56) References Cited

U.S. PATENT DOCUMENTS

| 2005/0178832 A1* | 8/2005 | Higuchi | G06K 7/0004 235/440 |
|---|---|---|---|
| 2006/0124723 A1 | 6/2006 | Satake et al. | |
| 2008/0002273 A1 | 1/2008 | Fujiwara | |
| 2008/0272886 A1* | 11/2008 | Tiller | G06K 19/08 340/10.1 |

(Continued)

FOREIGN PATENT DOCUMENTS

| JP | H03-003051 A | 1/1991 |
|---|---|---|
| JP | H10-228753 A | 8/1998 |
| JP | 2005-153465 A | 6/2005 |

(Continued)

OTHER PUBLICATIONS

English language translation of the following: Office action dated Oct. 1, 2019 from the JPO in a Japanese patent application No. 2017-023143 corresponding to the instant patent application. This office action translation is submitted now in order to supplement the understanding of the cited references which are being disclosed in the instant Information Disclosure Statement.

*Primary Examiner* — Edwyn Labaze
(74) *Attorney, Agent, or Firm* — Solaris Intellectual Property Group, PLLC

(57) ABSTRACT

A recording system includes: a reading part that reads information recorded on a first recording medium that is provided at a predetermined position on an outer circumferential surface of a recording tape cartridge, the information being visually recognizable from the outside; and a recording part that records the information read by the reading part on a second recording medium that is provided in the recording tape cartridge, of which recorded information is readable in a non-contact manner, in a case where the recording tape cartridge is first accessed.

8 Claims, 7 Drawing Sheets

(56) References Cited

U.S. PATENT DOCUMENTS

2010/0254241 A1* 10/2010 Aoki .................... G06F 3/0605
369/84

FOREIGN PATENT DOCUMENTS

| | | | |
|---|---|---|---|
| JP | 2005222511 | A | 8/2005 |
| JP | 2007-334958 | A | 12/2007 |

* cited by examiner

RECORDING SYSTEM AND RECORDING METHOD

CROSS-REFERENCE TO RELATED APPLICATION

This application claims priority under 35 USC 119 from Japanese Patent Application No. 2017-023143 filed Feb. 10, 2017, the disclosure of which is incorporated by reference herein.

BACKGROUND

Technical Field

The present disclosure relates to a recording system and a recording method.

Related Art

In the related art, a technique in which a barcode label and a nonvolatile memory are provided in a tape cassette has been proposed (see JP1998-228753A (JP-H10-228753A)). In this technique, identification information for identifying the tape cassette is recorded on the barcode label and the nonvolatile memory.

Further, an information processing device in which two nonvolatile memories are provided, and in a case where information recorded on one nonvolatile memory becomes extinct, information recorded on the other nonvolatile memory is recorded on the one nonvolatile memory has been proposed (see JP1991-003051A (JP-H03-003051A)).

In addition, a system in which information to be recorded on a radio frequency identifier (RFID) chip is generated on the basis of information obtained by reading a barcode and the generated information is recorded on the RFID chip has been proposed (see JP2005-153465A).

SUMMARY

However, in a first recording medium of which recorded information is visually recognizable from the outside, such as a barcode label, there is a case where it is not possible to read information recorded on the first recording medium due to degradation over time and peeling off of the barcode label. In this case, for example, it is possible to prevent loss of information recorded on the first recording medium by recording the same information as in the first recording medium on a second recording medium that is provided in a recording tape cartridge.

On the other hand, since it is not possible to recognize in advance when the information recorded on the first recording medium becomes an unreadable state, it is preferable to record the same information as in the first recording medium on the second recording medium in an early stage as much as possible. However, the techniques disclosed in JP1998-228753A (JP-H10-228753A), JP1991-003051A (JP-H03-003051A), and JP2005-153465A, a method for recording the same information as in the first recording medium on the second recording medium in an early stage is not considered.

The present disclosure has been made in consideration of the above-mentioned problems, and an object of the present disclosure is to provide a recording system and a recording method capable of recording information recorded on a first recording medium, which is visually recognizable from the outside, on a second recorded medium that is provided in a recording tape cartridge in an early stage.

In order to achieve the object, according to an aspect of the present disclosure, there is provided a recording system comprising: a reading part that reads information recorded on a first recording medium that is provided at a predetermined position on an outer circumferential surface of a recording tape cartridge, the information being visually recognizable from the outside; and a recording part that records the information read by the reading part on a second recording medium that is provided in the recording tape cartridge, of which recorded information is readable in a non-contact manner, in a case where the recording tape cartridge is first accessed.

In the recording system according to this aspect of the present disclosure, the case where the recording tape cartridge is first accessed may be a case where the information read by the reading part is not recorded in a storage region of the second recording medium in which the information is to be stored.

In the recording system according to this aspect of the present disclosure, the case where the recording tape cartridge is first accessed may be a case where the recording tape cartridge is first loaded in a tape drive or is first unloaded from the tape drive.

In the recording system according to this aspect of the present disclosure may further include: a second reading part that reads the information recorded on the second recording medium in a case where the information recorded on the first recording medium is not readable by the reading part.

In the recording system according to this aspect of the present disclosure, the second recording medium may be a nonvolatile memory.

In the recording system according to this aspect of the present disclosure, the first recording medium may be a barcode label, and the second recording medium may be an RFID tag.

Further, in the recording system according to this aspect of the present disclosure, the information recorded on the first recording medium may be individual identification information for identifying an individual of the recording tape cartridge.

On the other hand, in order to achieve the object, according to another aspect of the present disclosure, there is provided a recording method comprising: reading information recorded on a first recording medium that is provided at a predetermined position on an outer circumferential surface of a recording tape cartridge, the information being visually recognizable from the outside; and recording the read information on a second recording medium that is provided in the recording tape cartridge, of which recorded information is readable in a non-contact manner, in a case where the recording tape cartridge is first accessed.

According to the present disclosure, it is possible to record information recorded on a first recording medium, which is visually recognizable from the outside, on a second recording medium that is provided in a recording tape cartridge in an early stage.

BRIEF DESCRIPTION OF THE DRAWINGS

Exemplary Embodiments of the present invention will be described in detail with reference to the following figures, wherein.

DETAILED DESCRIPTION

Hereinafter, an exemplary embodiment for performing a technique of the present disclosure will be described in detail with reference to the accompanying drawings.

First Embodiment

Figure 1:
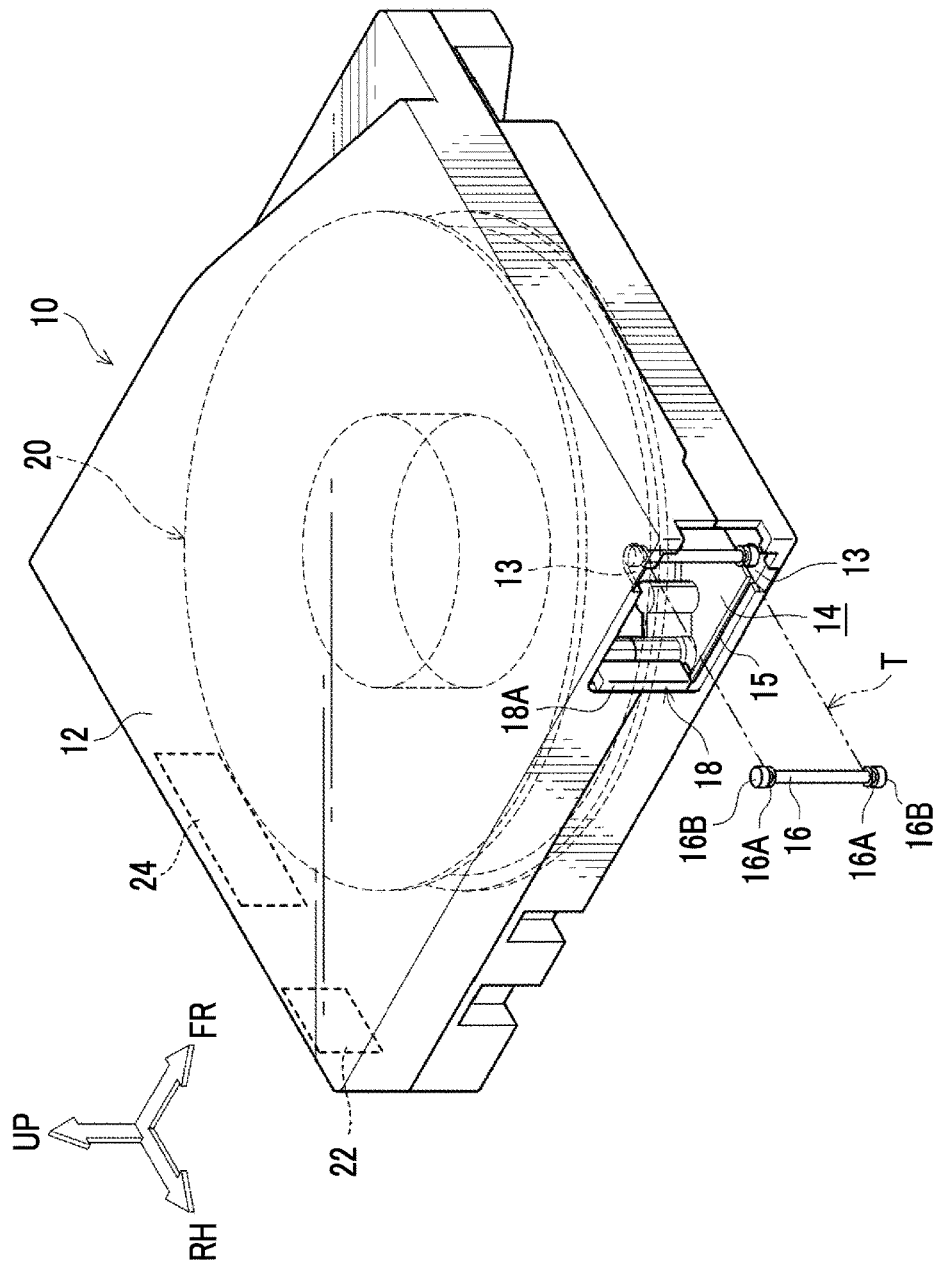
FIG. 1 is a perspective view showing an example of a recording tape cartridge according to each embodiment.

First, a configuration of a recording tape cartridge 10 according to this embodiment will be described with reference to FIG. 1. In FIG. 1, for ease of description, a direction in which the recording tape cartridge 10 is loaded into a drive device (not shown) is indicated by an arrow FR. Further, hereinafter, a direction indicated by the arrow FR is referred to as a forward direction (front side) of the recording tape cartridge 10. In addition, hereinafter, a direction indicated by an arrow RH that orthogonally intersects the arrow FR is referred to as a rightward direction (right side) of the recording tape cartridge 10, and a direction indicated by an arrow UP that orthogonally intersects the arrow FR and the arrow RH is referred to as an upward direction (upper side) of the recording tape cartridge 10.

As shown in FIG. 1, the recording tape cartridge 10 according to this embodiment includes a case 12 that is formed of a resin material such as polycarbonate (PC) in an approximately rectangular box shape. A resin reel 20 in which a recording tape T such as a magnetic tape that is an information recording reproduction medium is provided to be wound thereon is rotatably accommodated inside the case 12.

In a front part on a right wall of the case 12, an opening 14 for drawing out the recording tape T is formed. Further, on a free edge of the recording tape T drawn from the opening 14, a leader pin 16 that is a leader member that is operated to be drawn out while being locked by a drawer member (not shown) of the drive device is fixed. On opposite sides of the leader pin 16 in an axial direction thereof, annular grooves 16A are formed, and the annular grooves 16A are locked to hooks or the like of a drawer member.

Further, inside the opening 14 of the case 12, a pair of upper and lower pin holders 13 that positions and holds the leader pin 16 is formed in the case 12. The pin holder 13 is formed in an approximately semicircular shape that is opened on a side on which the recording tape T is drawn out, and opposite end portions 16B of the leader pin 16 in the axial direction in a state where the leader pin 16 is erected are able to enter the pin holders 13 through the opening side of the pin holder 13 or to exit therefrom.

The opening 14 of the case 12 is opened or closed by a door 18. The door 18 is formed in an approximately rectangular plate shape of such a size as to block the opening 14. Inside the opening 14, grooves 15 in which upper and lower end portions of the door 18 are slidably inserted are formed, and the door 18 is able to slidingly move along the right wall of the case 12.

Further, in a front end portion of the door 18, a convex portion 18A for opening and closing operations is provided to protrude rightward. In this configuration, as the convex portion 18A is engaged with an engaging member (not shown) of the drive device in accordance with loading of the recording tape cartridge 10 to the drive device, the door 18 is opened.

Figure 2:
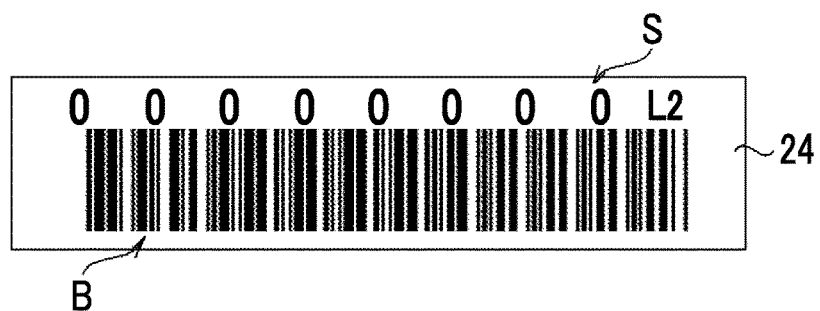
FIG. 2 is a diagram showing an example of a barcode recorded on a label according to each embodiment.

Further, a label 24 that is an example of a first recording medium of which recorded information is visually recognizable from the outside is provided at a predetermined position on an outer circumferential surface of the recording tape cartridge 10. In this embodiment, the label 24 is attached to an outer central portion of a rear surface of the case 12. In addition, a barcode B indicating individual identification information for identifying an individual of the recording tape cartridge 10 and a digit string S indicating the individual identification information are printed on the label 24 using a label printer or the like, for example, as shown in FIG. 2. In FIG. 2, a one-dimensional code is shown as the barcode B, but the barcode B may be a two-dimensional code such as a QR code (registered trademark).

In addition, an RFID tag 22 that is an example of a second recording medium of which recorded information is readable in a non-contact manner through wireless communication or the like is provided in the case 12. In FIG. 1, an example in which the RFID tag 22 is disposed in a right rear portion in the case 12 is shown, but a position at which the RFID tag 22 is disposed in the case 12 is not particularly limited. The position at which the RFID tag 22 is disposed in the case 12 may be any position at which information is readable by a second reading part 35 and a recording part 36 in a non-contact manner with the RFID tag 22. The RFID tag 22 according to this embodiment includes a nonvolatile memory, in which a storage region K in which individual identification information is to be stored is determined in advance.

Further, the RFID tag 22 according to this embodiment is an RFID tag of a type (so-called passive method) in which recorded information is transmitted, according to radio waves transmitted by a reading device such as an RFID reader, to the reading device.

Figure 3:
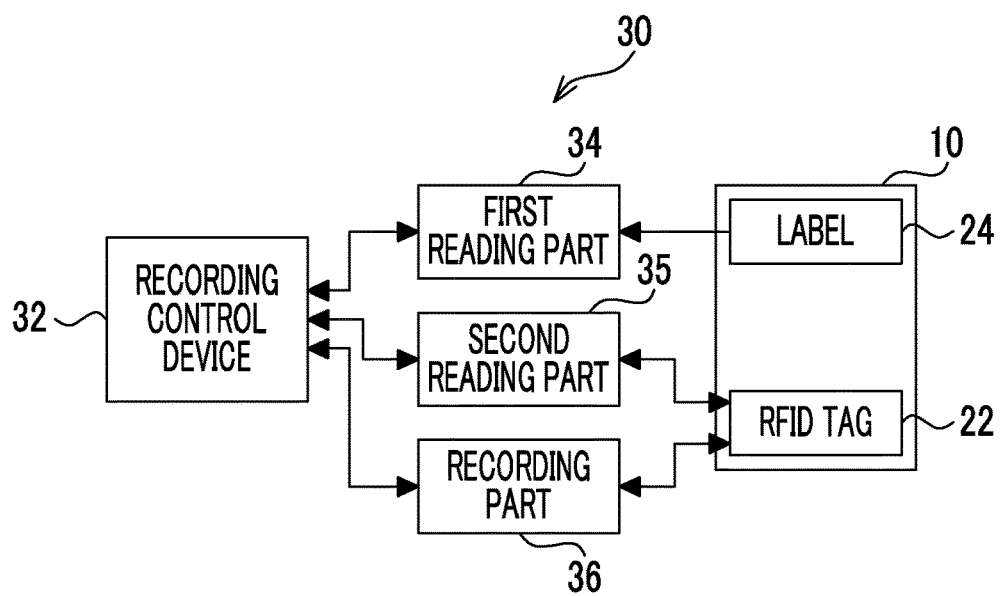
FIG. 3 is a block diagram showing an example of a configuration of a recording system according to a first embodiment.

Next, a configuration of a recording system 30 according to this embodiment will be described with reference to FIG. 3. As shown in FIG. 3, the recording system 30 includes a recording control device 32, the first reading part 34, the second reading part 35, and the recording part 36. The recording control device 32 and the first reading part 34 are connected to each other in a communicable manner. Further, the recording control device 32 and the second reading part 35 are connected to each other in a communicable manner. In addition, the recording control device 32 and the second recording part 36 are connected to each other in a communicable manner. As an example of the recording control device 32, an information processing device such a personal computer or a server computer may be used.

The first reading part 34 according to this embodiment optically reads the barcode B printed on the label 24, and outputs the individual identification information indicated by the read barcode B to the recording control device 32, under the control of the recording control device 32. As an example of the first reading part 34, a barcode reader may be used.

The second reading part 35 according to this embodiment reads information recorded on the RFID tag 22 that is provided in the recording tape cartridge 10 in a non-contact manner under the control of the recording control device 32, and outputs the read information to the recording control device 32. Specifically, the second reading part 35 transmits radio waves to the RFID tag 22 under the control of the recording control device 32. In a case where the RFID tag 22 receives the radio waves transmitted from the second reading part 35, the RFID tag 22 transmits the information recorded on the RFID tag 22 to the second reading part 35. The second reading part 35 receives the information transmitted from the RFID tag 22, and outputs the received information to the recording control device 32. As an example of the second reading part 35, an RFID reader may be used.

The recording part 36 according to this embodiment records individual identification information read by the first reading part 34 in a storage region K of the RFID tag 22 under the control of the recording control device 32. Specifically, the recording part 36 transmits radio waves including individual identification information to the RFID tag 22 under the control of the recording control device 32. The RFID tag 22 receives the radio waves transmitted from the recording part 36, and writes the individual identification information included in the received radio waves in the storage region K. As an example of the recording part 36, an RFID writer may be used. The second reading part 35 and the recording part 36 may be an RFID reader/writer that is integrally formed.

Figure 4:
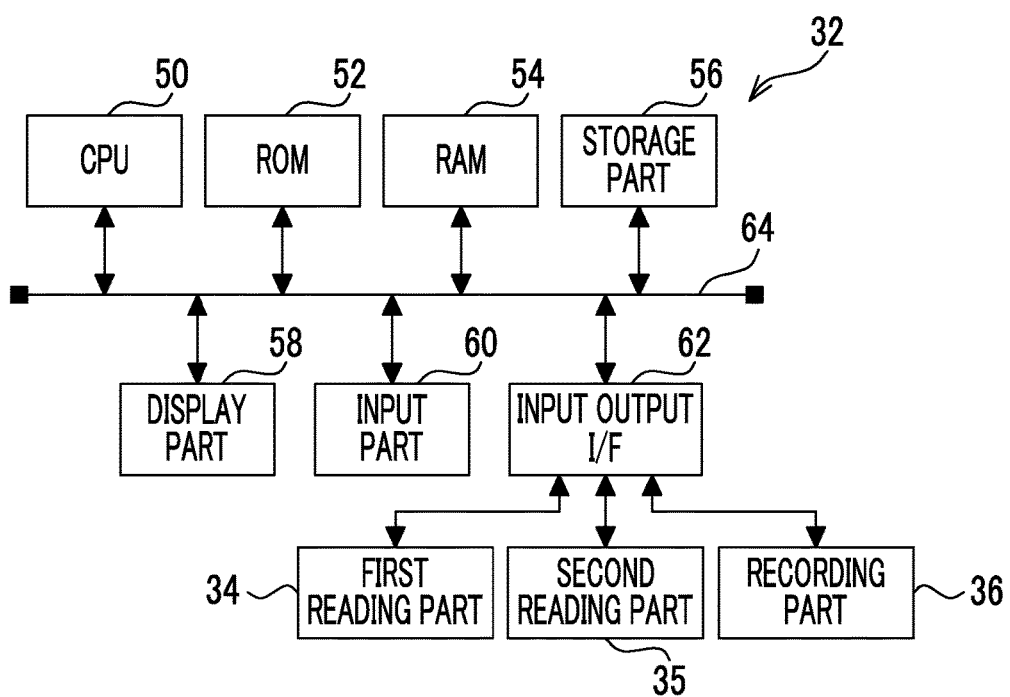
FIG. 4 is a block diagram showing an example of a configuration of main parts of an electric system of a recording control device according to the first embodiment.

Then, the configuration of main parts of an electric system of the recording control device 32 according to this embodiment will be described with reference to FIG. 4. As shown in FIG. 4, the recording control device 32 includes a central processing unit (CPU) 50, and a read-only memory (ROM) 52 in which various programs, various parameters, or the like are stored in advance. Further, the recording control device 32 includes a random access memory (RAM) 54 used as a work area or the like in a case where various programs are executed by the CPU 50, and a non-volatile storage part 56 such as a hard disk drive (HDD).

Further, the recording control device 32 includes a display part 58 such as a liquid crystal display, an input part 60 such as a keyboard or a mouse, and an input output interface (UF) 62. Further, the respective parts of the CPU 50, the ROM 52, the RAM 54, the storage part 56, the display part 58, the input part 60, and the input output I/F 62 are connected to each other through a bus 64. In addition, the first reading part 34, the second reading part 35, and the recording part 36 are connected to the input output I/F 62.

Figure 5:
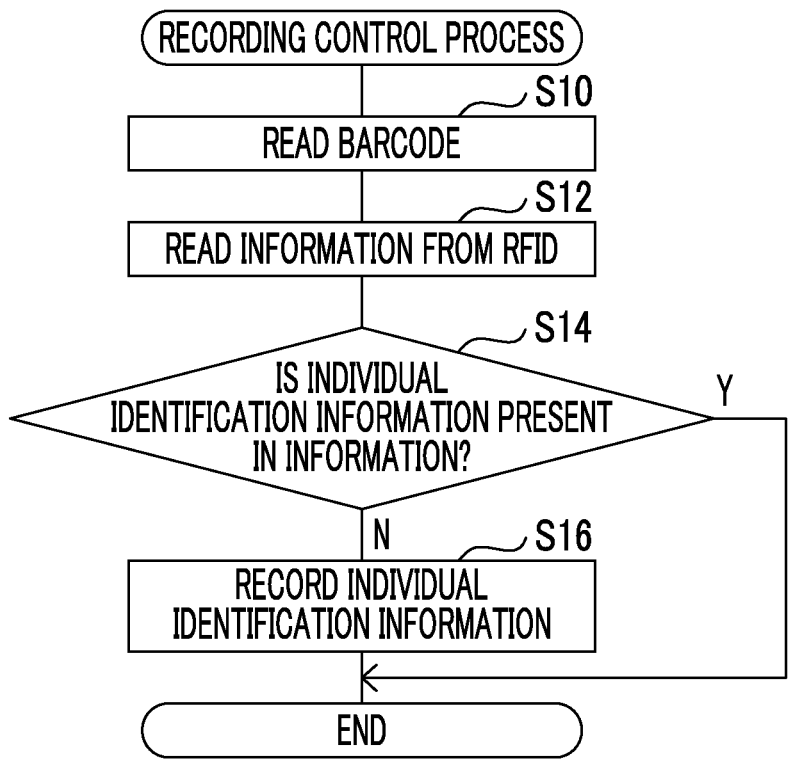
FIG. 5 is a flowchart showing an example of a flow of a recording control process according to the first embodiment.

Next, an operation of the recording system 30 according to this embodiment will be described with reference to FIG. 5. As the CPU 50 of the recording control device 32 executes a recording control program, a recording control process shown in FIG. 5 is executed. The recording control program is installed in advance in the ROM 52 of the recording control device 32. Further, the recording control process shown in FIG. 5 is executed in a case where an execution instruction is input from a user through the input part 60 in a recording tape cartridge manufacturing process, for example.

In this embodiment, the user disposes the recording tape cartridge 10 at a position where the barcode B of the label 24 attached to the rear surface of the recording tape cartridge 10 is readable by the first reading part 34 and at the following position. That is, in this case, the user disposes the recording tape cartridge 10 at the position where the barcode B is readable by the first reading part 34, and at a position where information relating to the RFID tag 22 is readable and writable by the second reading part 35 and the recording part 36. Further, the user inputs an execution instruction of the recording control process through the input part 60 after completion of the disposition.

In step S10 of FIG. 5, the CPU 50 performs a control for causing the first reading part 34 to read the barcode B printed on the label 24, and acquires individual identification information indicated by the barcode B read by the first reading part 34 through the input output I/F 62. In the next step S12, the CPU 50 performs a control for causing the second reading part 35 to read information recorded on the RFID tag 22, and acquires the information read by the second reading part 35 through the input output I/F 62.

In the next step S14, the CPU 50 determines whether the individual identification information acquired in step S10 is included in the information acquired in step S12. In a case where the determination is negative, the CPU 50 considers that the recording tape cartridge 10 is first accessed, and then, the procedure proceeds to step S16.

In step S16, the CPU 50 performs a control for causing the recording part 36 to record the individual identification information acquired in step S10 in the storage region K of the RFID tag 22. In a case where the process of step S16 is terminated, the recording control process is terminated. On the other hand, in a case where the determination of step S14 is affirmative, the process of step S16 is not executed, and then, the recording control process is terminated.

As described above, according to this embodiment, information recorded on the first recording medium that is provided at a predetermined position of an outer circumferential surface of a recording tape cartridge, of which recorded information is visually recognizable from the outside, is read. Further, the read information is recorded on a second recording medium that is provided in the recording tape cartridge, of which recorded information is readable in a non-contact manner, in a case where the recording tape cartridge is first accessed. Accordingly, it is possible to record the information recorded on the first recording medium of which the recorded information is visually recognizable from the outside on the second recording medium that is provided in the recording tape cartridge in an early stage.

Second Embodiment

A second embodiment of a technique of the present disclosure will be described. Since the configuration (see FIG. 1) of the recording tape cartridge 10 is the same as in the first embodiment, description thereof will not be repeated.

Figure 6:
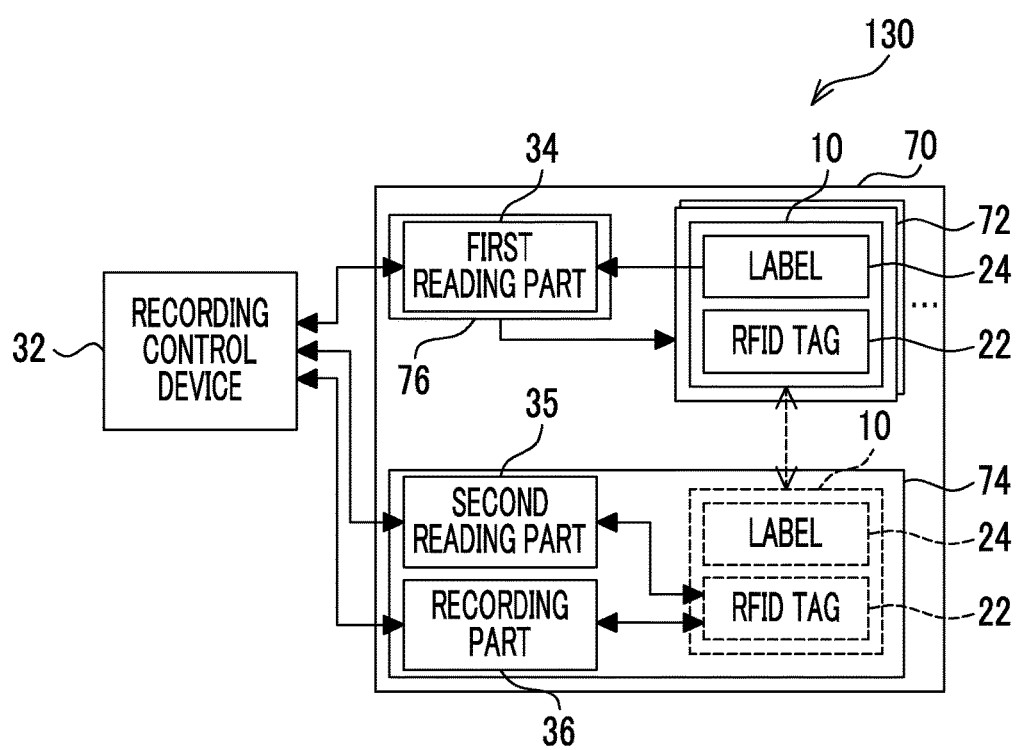
FIG. 6 is a block diagram showing an example of a configuration of a recording system according to a second embodiment.

First, a configuration of a recording system 130 according to to this embodiment will be described with reference to FIG. 6. In FIG. 6, the same reference numerals are given to the same components in FIG. 3, and description thereof will be not repeated. The recording system 130 includes the recording control device 32 and a tape library 70.

The tape library 70 according to this embodiment includes a plurality of slots 72, a tape drive 74, and a movement mechanism 76. A plurality of tape drives 74 may be provided. The recording tape cartridge 10 is stored in the slot 72. In a case where reading or writing with respect to a recording tape T of the recording tape cartridge 10 is performed, the recording tape cartridge 10 is loaded into the tape drive 74. Further, after the reading or writing with respect to the recording tape T of the recording tape cartridge 10 that is loaded into the tape drive 74 is terminated, the recording tape cartridge 10 is unloaded from the tape drive 74. The second reading part 35 and the recording part 36 are provided in the tape drive 74 according to this embodiment.

The movement mechanism 76 according to this embodiment extracts the recording tape cartridge 10 from the slot 72 and loads the extracted recording tape cartridge 10 to the tape drive 74, under the control of the recording control device 32. Further, the movement mechanism 76 unloads the recording tape cartridge 10 from the tape drive 74 and stores the unloaded recording tape cartridge 10 in the slot 72, under the control of the recording control device 32. In addition, the first reading part 34 is attached to the movement mechanism 76.

Figure 7:
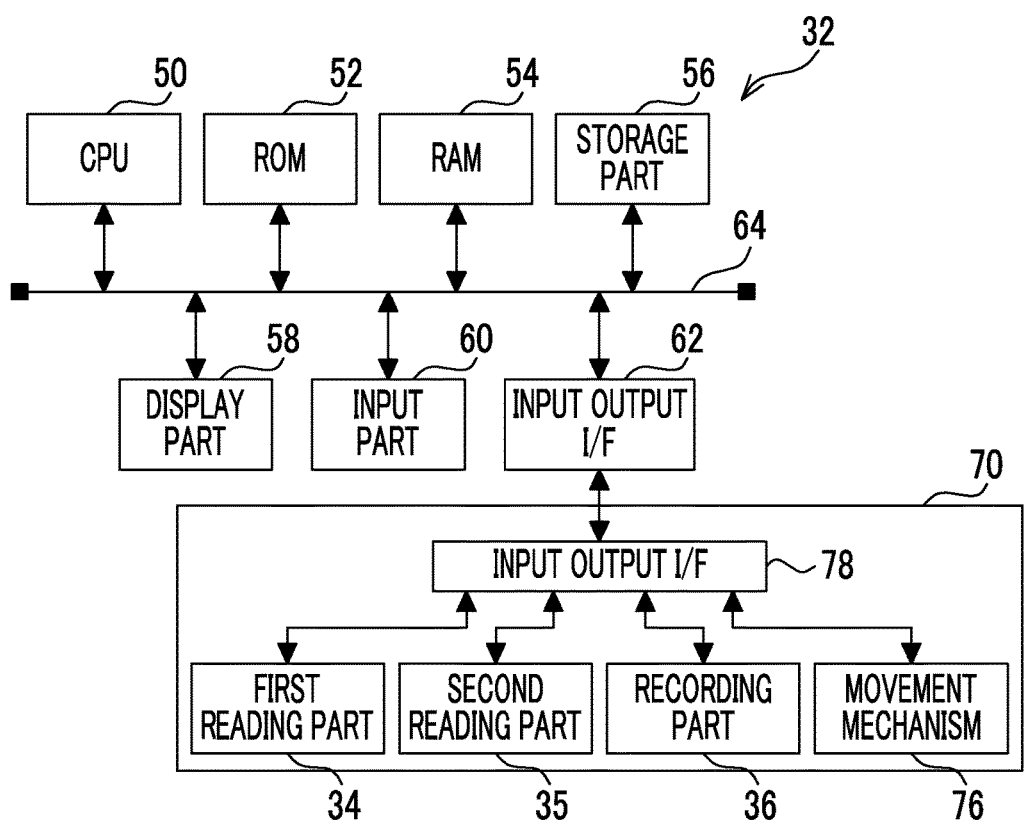
FIG. 7 is a block diagram showing an example of a configuration of main parts of an electric system of a recording control device according to the second embodiment.

Next, configurations of main parts of an electric system of the recording control device 32 according to this embodiment will be described with reference to FIG. 7. In FIG. 7, the same numeral references are given to the same components in FIG. 4, and description thereof will not be repeated. As shown in FIG. 7, the input output I/F 62 of the recording control device 32 is connected to an input output I/F 78 of the tape library 70. Further, the first reading part 34, the second reading part 35, the recording part 36, and the movement mechanism 76 are connected to the input output I/F 78 of the tape library 70. With such a configuration, the CPU 50 may control the first reading part 34, the second reading part 35, the recording part 36, and the movement mechanism 76 through the input output I/F 62 and the input output I/F 78.

Further, in a predetermined storage region of the storage part 56 according to this embodiment, the number of times of loading of the recording tape cartridge 10 to the tape drive 74 (hereinafter, referred to as "the number of loading times") is stored for each recording tape cartridge 10. In this embodiment, an initial value of the number of loading times is set to 0.

Figure 8:
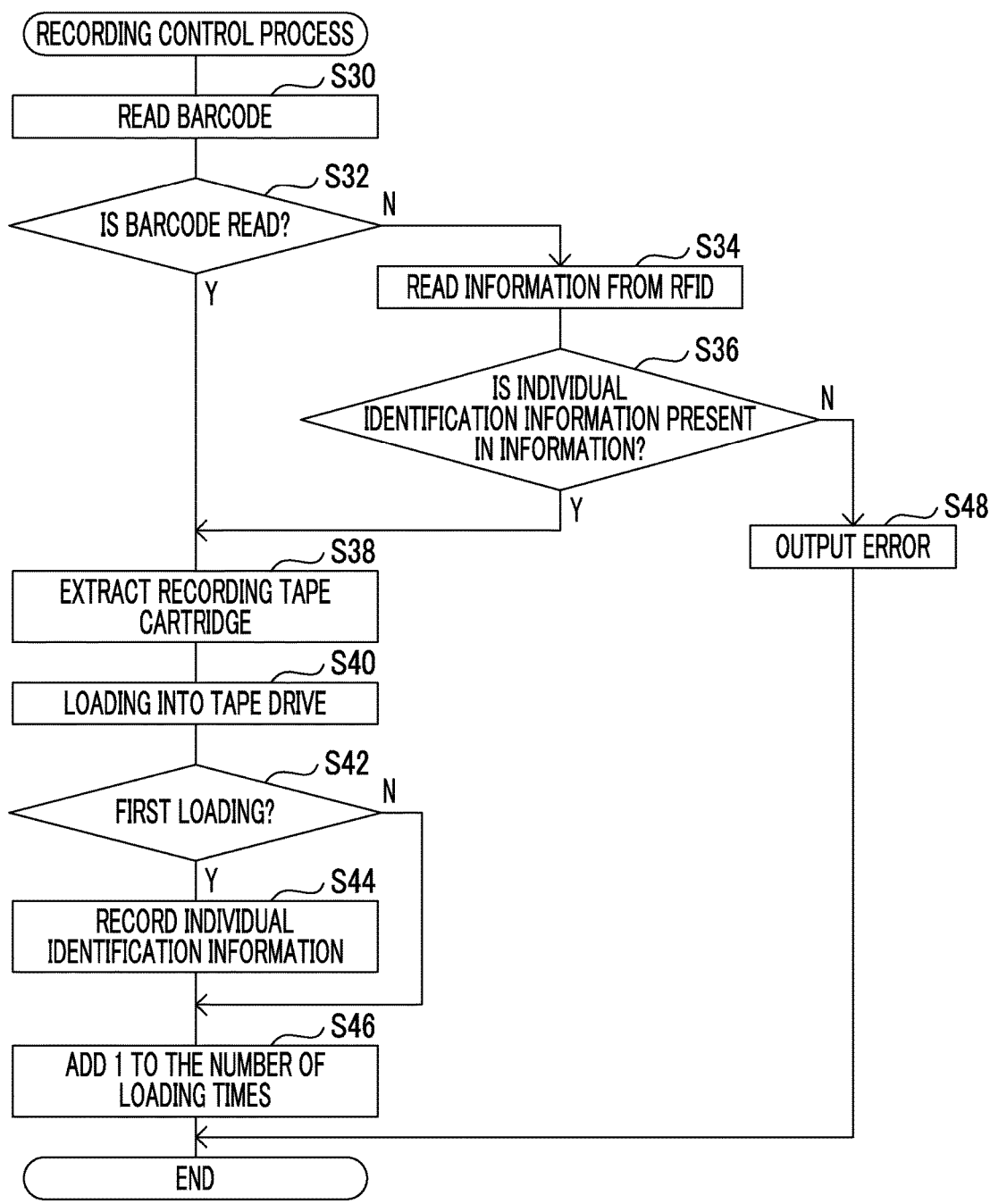
FIG. 8 is a flowchart showing an example of a flow of a recording control process according to the second embodiment.

Next, an operation of the recording system 30 according to this embodiment will be described with reference to FIG. 8. As the CPU 50 of the recording control device 32 executes a recording control program, a recording control process shown in FIG. 8 is executed. The recording control program is installed in advance in the ROM 52 of the recording control device 32. Further, the recording control process shown in FIG. 8 is executed in a case where an execution instruction is input from a user through the input part 60. For example, in a case where the user loads the recording tape cartridge 10 stored in the slot 72 to the tape drive 74, the user inputs the execution instruction of the recording control process through the input part 60. Further, in order to avoid complication, reading and writing processes with respect to the recording tape T of the recording tape cartridge 10 loaded into the tape drive 74 will not be described. Further, in order to avoid complication, a process of unloading the recording tape cartridge 10 from the tape drive 74 and storing the recording tape cartridge 10 in the slot 72 will not be described.

In step S30 of FIG. 8, the CPU 50 moves the movement mechanism 76 to a position where the barcode B of the label 24 attached to the recording tape cartridge 10 stored in the slot 72 is readable by the first reading part 34. Further, the CPU 50 performs a control for causing the first reading part 34 to read the barcode B printed on the label 24, and acquires individual identification information indicated by the barcode B through the input output I/F 62, in a similar way to the above-described step S10. In the next step S32, the CPU 50 determines whether it is possible to normally read the barcode B in step S30. In a case where the determination is affirmative, the procedure proceeds to step S38, and in a case where the determination is negative, the procedure proceeds to step S34.

In step S34, the CPU 50 performs a control for causing the second reading part 35 to read information recorded on the RFID tag 22, and acquires the information read by the second reading part 35 through the input output I/F 62. In step S34, the CPU 50 determines whether the individual identification information is included in the information acquired in step S34. In a case where the determination is affirmative, the procedure proceeds to step S38.

In step S38, the CPU 50 performs a control for causing the movement mechanism 76 to extract the recording tape cartridge 10 from the slot 72. In step S40, the CPU 50 performs a control for causing the movement mechanism 76 to move the recording tape cartridge 10 extracted in step S38 to the position of the tape drive 74, and then, loading the recording tape cartridge 10 to the tape drive 74. Through the process of step S40, the recording tape cartridge 10 is loaded into the tape drive 74.

In the next step S42, the CPU 50 determines whether the recording tape cartridge 10 is first loaded into the tape drive 74 by determining whether the number of loading times stored in the storage part 56 is 0 or not. In a case where the determination is negative, the procedure proceeds to step S46, and in a case where the determination is affirmative, the CPU 50 considers that the recording tape cartridge 10 is first accessed, and then, the procedure proceeds to step S44.

In step S44, the CPU 50 performs a control for causing the recording part 36 to record the individual identification information acquired in step S30 in the storage region K of the RFID tag 22, in a similar way to step S16. In step S46, the CPU 50 updates the number of loading times by adding 1 to the number of loading times stored in the storage part 56. In a case where the process of step S46 is terminated, the recording control process is terminated.

On the other hand, in a case where the determination of step S36 is negative, the procedure proceeds to step S48. In step S48, the CPU 50 outputs a message indicating that the reading of the individual identification information is erroneous. For example, the CPU 50 outputs a message indicating that the reading of the individual identification information is erroneous to the display part 58, to thereby display the message on the display part 58. In a case where the process of step S48 is terminated, the recording control process is terminated.

As described above, according to this embodiment, it is possible to achieve the same effects as in the first embodiment.

Further, according to this embodiment, in a case where the recording tape cartridge is first loaded from the tape drive, information recorded on the first recording medium is recorded on the second recording medium. Accordingly, it is possible to reliably record the information recorded on the first recording medium on the second recording medium in an early stage.

In addition, according to this embodiment, in a case where individual identification information recorded on the first recording medium is not read, individual identification information recorded on the second recording medium is read. Accordingly, even in a case where the first recording medium deteriorates, it is possible to identify an individual of the recording tape cartridge.

In the second embodiment, a case where individual identification information recorded on the label 24 is recorded on the RFID tag 22 in a case where the recording tape cartridge 10 is first loaded into the tape drive 74 has been described, but the present disclosure is not limited thereto. For example, a configuration in which individual identification information recorded on the label 24 is recorded on the RFID tag 22 in a case where the recording tape cartridge 10 is first unloaded from the tape drive 74 may be used.

Further, in the second embodiment, a case where the number of loading times is stored in the storage part 56 has been described, but the present disclosure is not limited thereto. For example, a configuration in which the number of loading times is recorded in a storage region other than the storage region K of the RFID tag 22 may be used.

Further, in the respective embodiments, a configuration in which the number of times of communication between the recording part 36 and the RFID tag 22 is recorded in a storage region other than the storage region K of the RFID tag 22 may be used. In this case, a configuration in which it is considered that the recording tape cartridge 10 is first accessed in a case where the number of communication times recorded in the RFID tag 22 is 0 may be used, for example.

In the respective embodiments, a case where the label 24 is applied as the first recording medium of which recorded information is visually recognizable from the outside has been described, but the present disclosure is not limited thereto. For example, a configuration in which a sheet such as plain paper is applied as the first recording medium may be used.

Further, in the respective embodiments, a case in which individual identification information is recorded on the first recording medium has been described, but the present disclosure is not limited thereto. For example, a configuration in which information relating to the recording tape cartridge 10 other than the individual identification information, such as a manufacturing date, a manufacturer name, or the like of the recording tape cartridge 10, is recorded on the first recording medium may be used.

In addition, in the respective embodiments, a case in which the RFID tag 22 is applied as the second recording medium of which recorded information is readable in a non-contact manner has been described, but the present disclosure is not limited thereto. For example, a configuration in which a memory card provided with a wireless communication function is applied as the second recording medium may be used.

In the respective embodiments, a case in which an RFID tag of a passive method is applied as the RFID tag 22 has been described, but the present disclosure is not limited thereto. For example, a configuration in which an RFID tag of a type (so-called active method) in which radio waves are transmitted is applied as the RFID tag 22 may be used.

Further, in the respective embodiments, a case in which individual identification information is recorded on the label 24 has been described, but the present disclosure is not limited thereto. For example, a configuration in which the individual identification information is formed at a predetermined position on an outer circumferential surface (for example, a rear surface) of the case 12, for example, using laser and ink may be used.

Furthermore, in the respective embodiments, a configuration in which a recording control program is stored (installed) in the ROM 52 in advance has been described, but the present disclosure is not limited thereto. The recording control program may be provided in a form in which the recording control program is recorded on a recording medium such as a compact disk read-only memory (CD-ROM), a digital versatile disk read-only memory (DVD-ROM), or a universal serial bus (USB) memory. Further, the recording control program may be downloaded from an external device through a network.

What is claimed is:

1. A recording system comprising:
a reading part that reads information recorded on a first recording medium that is provided at a predetermined position on an outer circumferential surface of a recording tape cartridge, the information being visually recognizable from the outside; and
a recording part that records the information read by the reading part on a second recording medium that is provided in the recording tape cartridge, of which recorded information is readable in a non-contact manner, in a case where the recording tape cartridge is first accessed.

2. The recording system according to claim 1,
wherein the case where the recording tape cartridge is first accessed is a case where the information read by the reading part is not recorded in a storage region of the second recording medium in which the information is to be stored.

3. The recording system according to claim 1,
wherein the case where the recording tape cartridge is first accessed is a case where the recording tape cartridge is first loaded in a tape drive or is first unloaded from the tape drive.

4. The recording system according to claim 1, further comprising:
a second reading part that reads the information recorded on the second recording medium in a case where the information recorded on the first recording medium is not readable by the reading part.

5. The recording system according to claim 1,
wherein the second recording medium is a nonvolatile memory.

6. The recording system according to claim 1,
wherein the first recording medium is a barcode label, and the second recording medium is an RFID tag.

7. The recording system according to claim 1,
wherein the information recorded on the first recording medium is individual identification information for identifying an individual of the recording tape cartridge.

8. A recording method comprising:
reading information recorded on a first recording medium that is provided at a predetermined position on an outer circumferential surface of a recording tape cartridge, the information visually recognizable from the outside; and
recording the read information on a second recording medium that is provided in the recording tape cartridge, of which recorded information is readable in a non-contact manner, in a case where the recording tape cartridge is first accessed.

* * * * *